Jan. 3, 1928. 1,654,784
L. BOUDIN
APPARATUS FOR FORMING SHEET GLASS
Original Filed Oct. 5, 1925
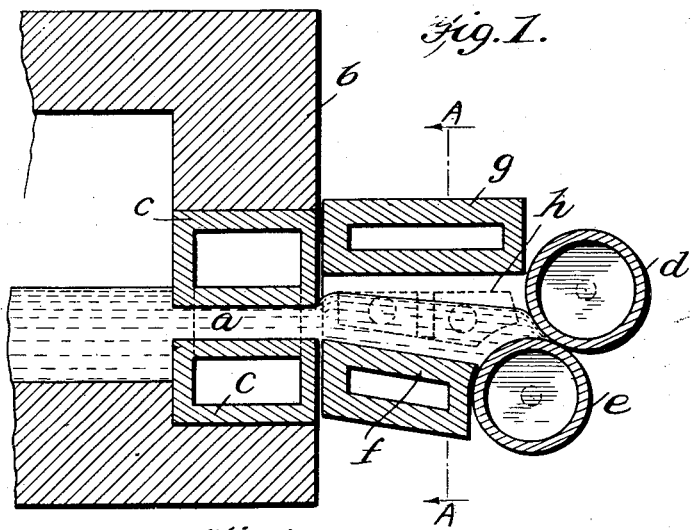
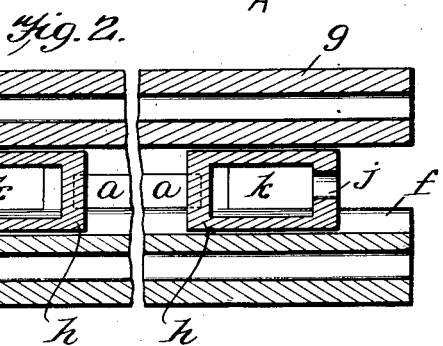
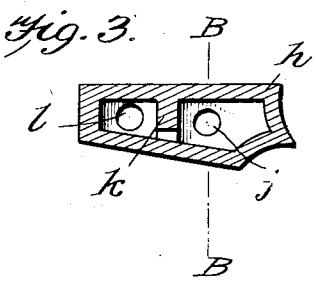
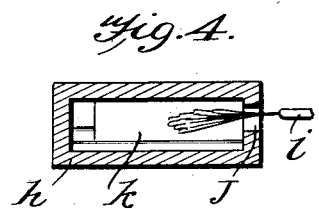
Inventor
LOUIS BOUDIN.
Attorneys Patented Jan. 3, 1928.

1,654,784

UNITED STATES PATENT OFFICE.

LOUIS BOUDIN, OF ST.-GOBAIN, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE.

APPARATUS FOR FORMING SHEET GLASS.

Application filed October 5, 1925, Serial No. 60,597, and in France October 10, 1924. Renewed March 31, 1927.

Among the known processes for the manufacture of glass there is one which embodies flowing the glass through a horizontal slot in the side wall of the furnace over and down an inclined weir by which it is delivered to rolls. Difficulty has heretofore been experienced in this process in that the upper surface of the glass moving on the weir has a different temperature from that of the bottom surface which is in contact with the weir, and hence difficulty has been experienced in the fabrication of sheets. I propose to overcome these defects by enclosing the glass from the time of issuance from the furnace slot to the time of its passage between the rolls in a heated chamber closed on four sides, one end of the chamber being against the furnace wall around the slot, and the other end terminating at the rollers, the side walls of the chamber being laterally adjustable to vary the width of the weir and thus the width of the stream of glass entering between the rolls. For this purpose my invention consists in the construction, arrangement and combination of the several parts of which it is composed and will be hereinafter more fully described and claimed.

Referring to the accompanying drawings in which corresponding parts are designated by corresponding marks of reference, Figure 1 is a longitudinally vertical section through an apparatus embodying my invention.

Figure 2 is a transverse vertical section on lines A—A thereof.

Figure 3 is a longitudinal section through one of the cheek blocks.

Figure 4 is a transverse section on the line B—B of Figure 3.

In the drawing $b$ represents the outer wall of a glass container, preferably the end wall of a forehearth of a glass furnace. Located in this wall are the hollow refractory blocks $c$—$c$ spaced apart and forming between them a horizontally elongated slot $a$ through which glass may issue under gravity head from the forehearth. The interior of these blocks may be heated either directly by flames or by circulation of products of combustion therethrough.

Against the outside of the block $c$ forming the lower lip of the slot is the inclined hollow weir block $f$, over which is located at a distance somewhat greater than the width of the slot itself, the hollow cover block $g$. Located between the blocks $f$ and $g$ are the cheek blocks $h$ also hollow. These blocks may be heated by flame or products of combustion circulating through their interior as are the blocks $c$. In Figures 3 and 4, I have shown the cheek blocks as provided with ports $j$, through which flame from the burners $i$ may be directed, as suitable baffle $k$ being within each block to direct the products of combustion adjacent to the lower and inner faces of the block before such products emerge from block.

Opposite the open end of the chamber formed by the hollow blocks $f$, $g$ and $h$ are the forming rollers $d$ and $e$, driven in any suitable manner and of any approved construction, the outer ends of the cheek blocks being shaped to accommodate them to the contour of the rollers.

The cheek blocks $h$ are laterally adjustable between the top and bottom blocks $f$ and $g$, and thus serve to regulate the effective widths of the glass passage over the weir $f$ and thus of the stream of glass delivered to the rolls. They also may serve when brought closely together as a closing device for the slot $a$.

It will be thus seen that I have provided means whereby glass after its issuance from the slot and prior to its entry between the rolls is maintained at uniform temperature conditions on all sides and at the same time, whereby the width of the stream of glass delivered to the rollers may be varied.

Having thus described my invention what I claim as new and desire to secure by Letters Patent is:—

1. The combination with a container having a flow slot therein; of rolls; a heating chamber intermediate of a slot and rolls, the bottom of the chamber forming a weir between the slot and rolls, and the side walls of the chamber being laterally adjustable to and from each other.

2. The combination with a container for molten glass having a feed slot therein, of forming rollers, a chamber interposed between the slot and the rollers and formed of blocks having internal cavities whereby they are heated, the side blocks of such chamber being laterally adjustable to and from each other.

In testimony whereof I hereunto affix my signature.

LOUIS BOUDIN.